April 8, 1947. E. A. ROCKWELL 2,418,666
POWER UNIT SYSTEM FOR APPLYING BRAKES
Original Filed Nov. 25, 1938 5 Sheets-Sheet 1
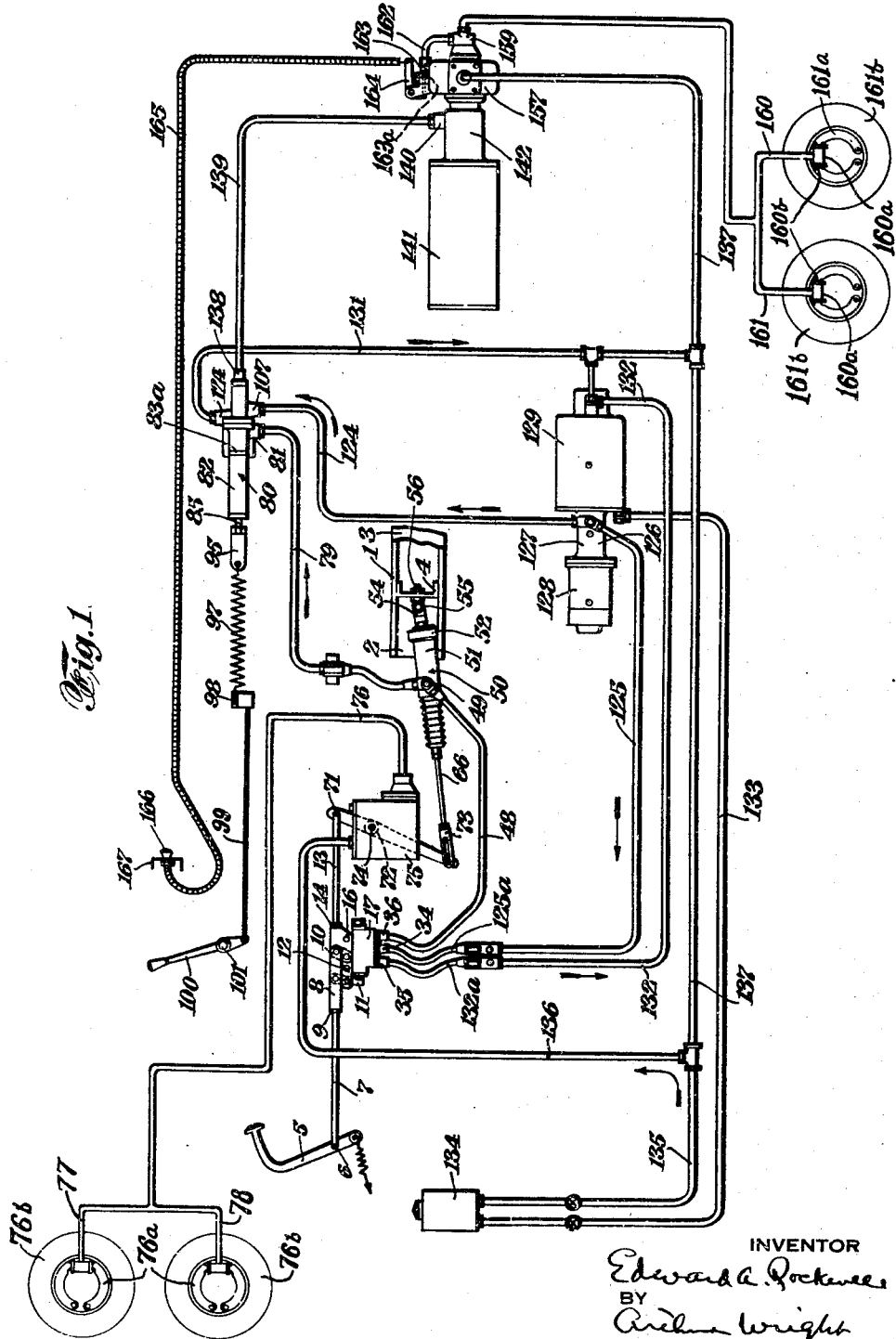
INVENTOR
Edward A. Rockwell
BY
Archon Wright
ATTORNEY

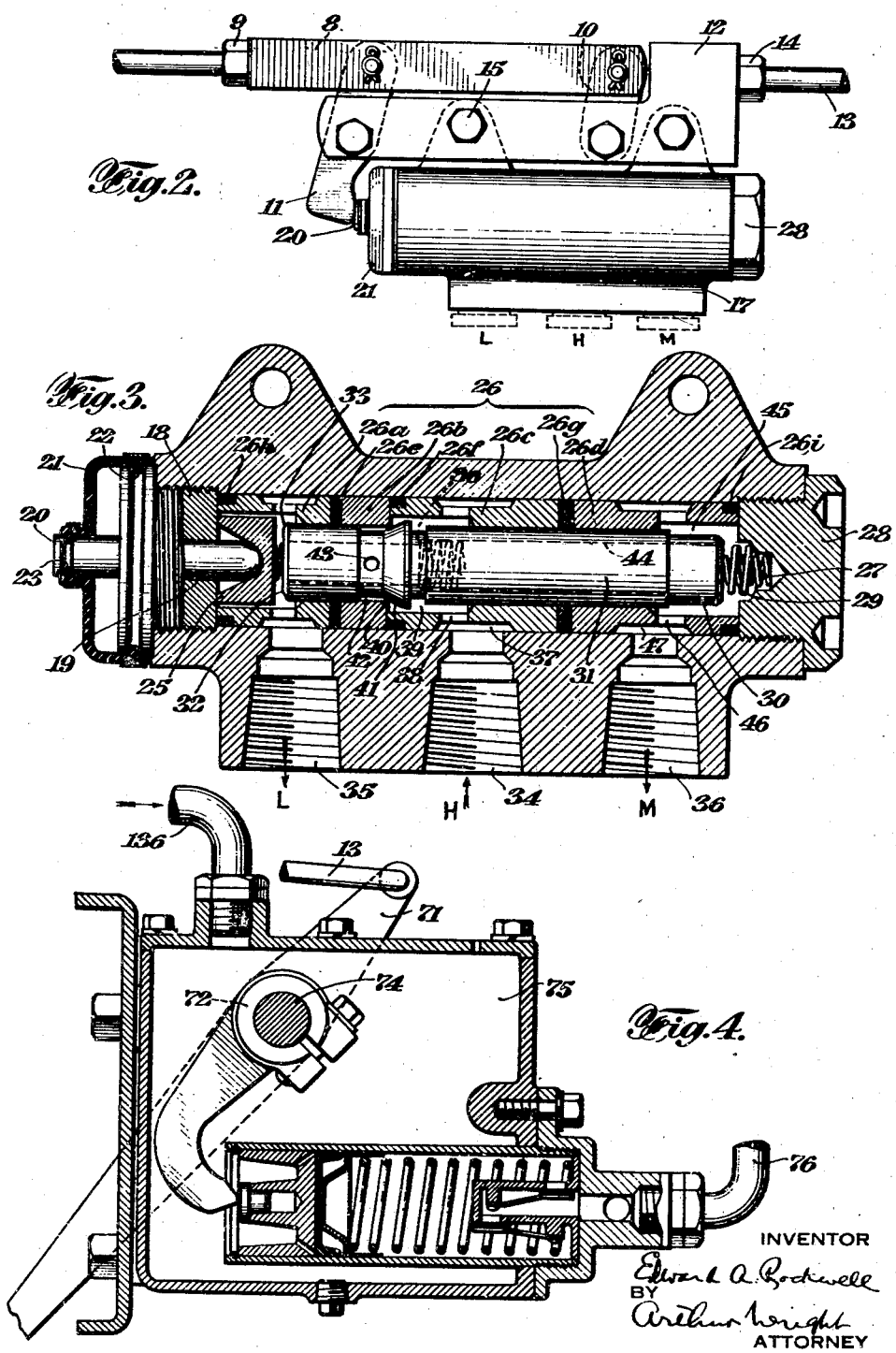

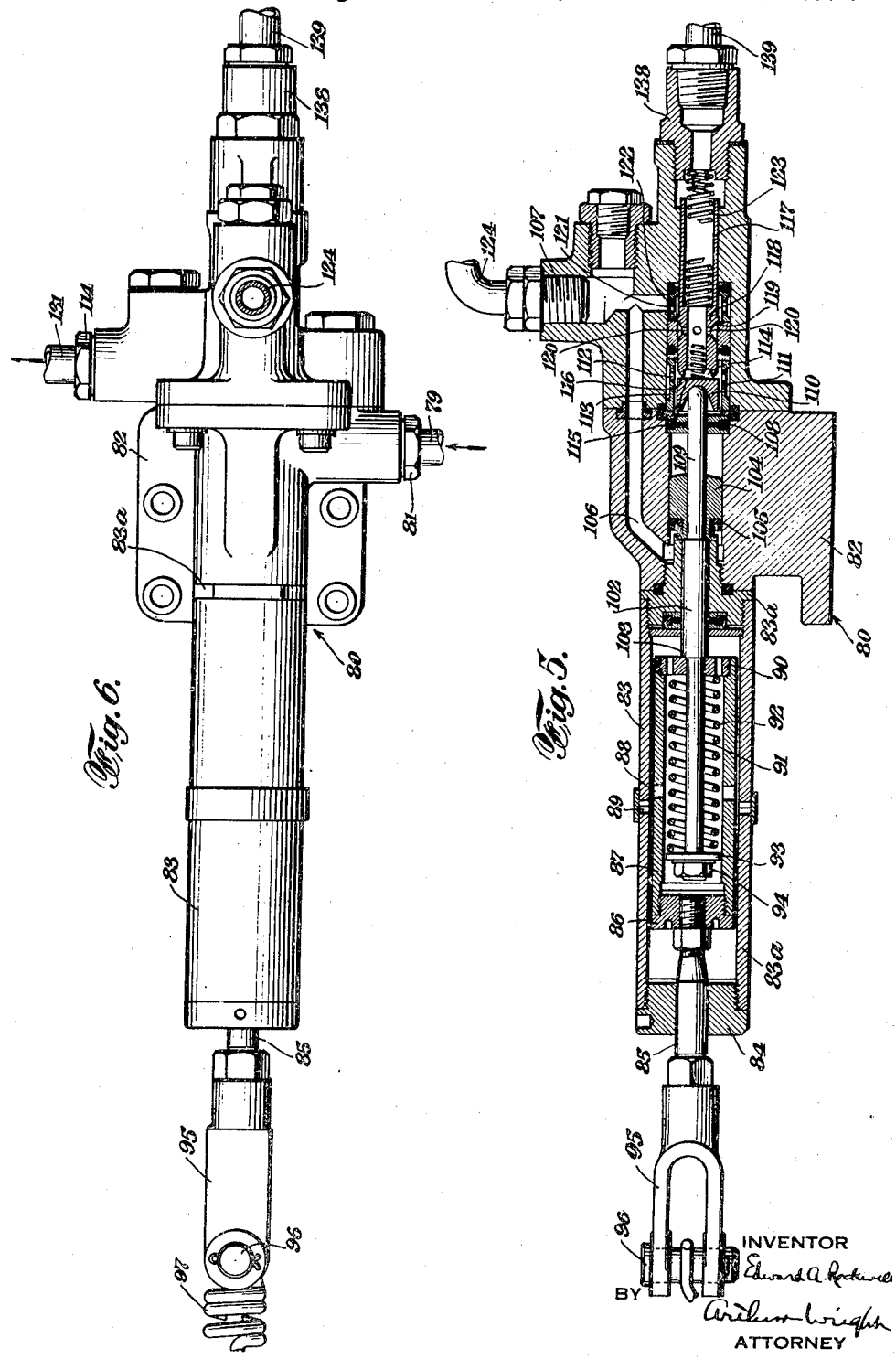

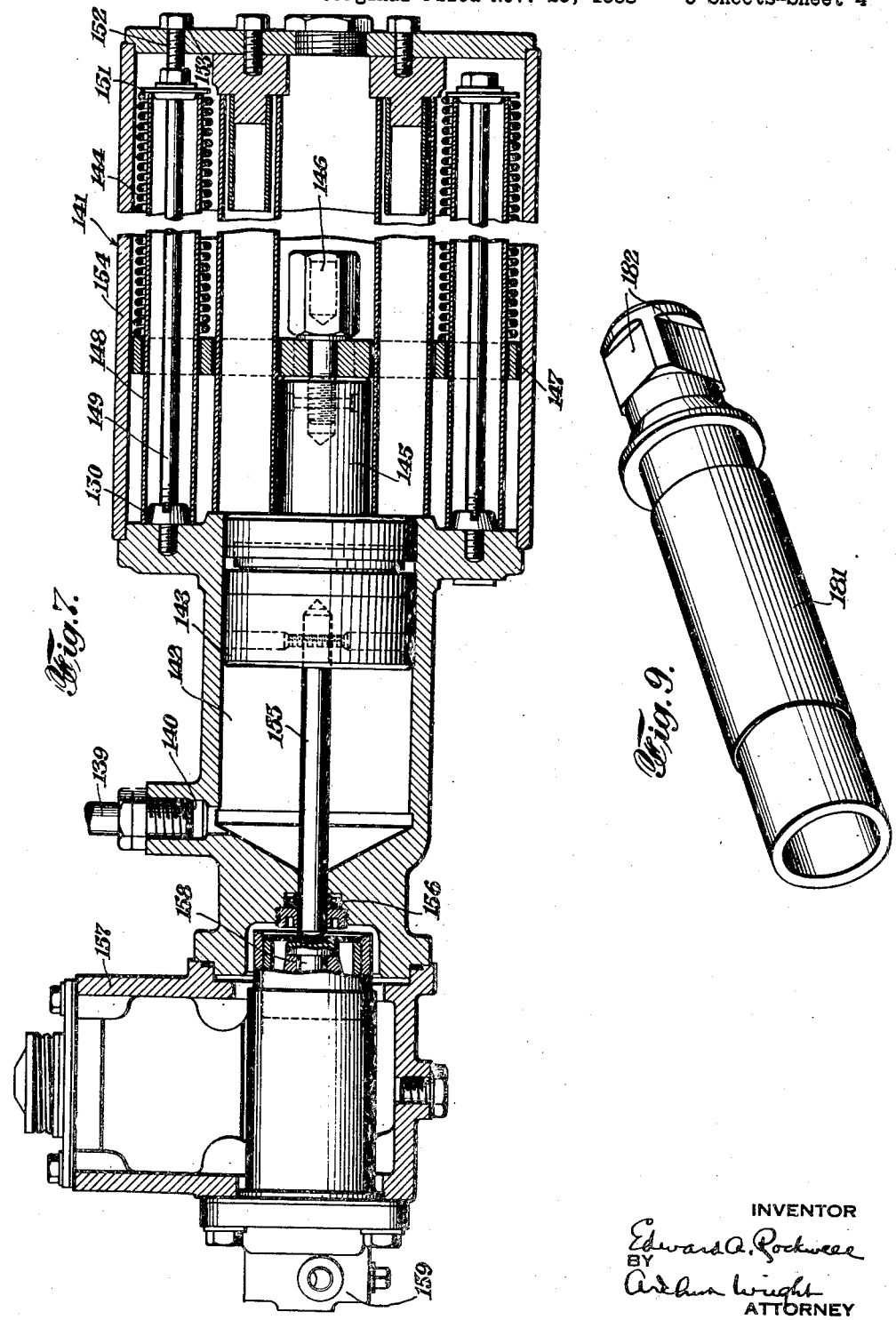

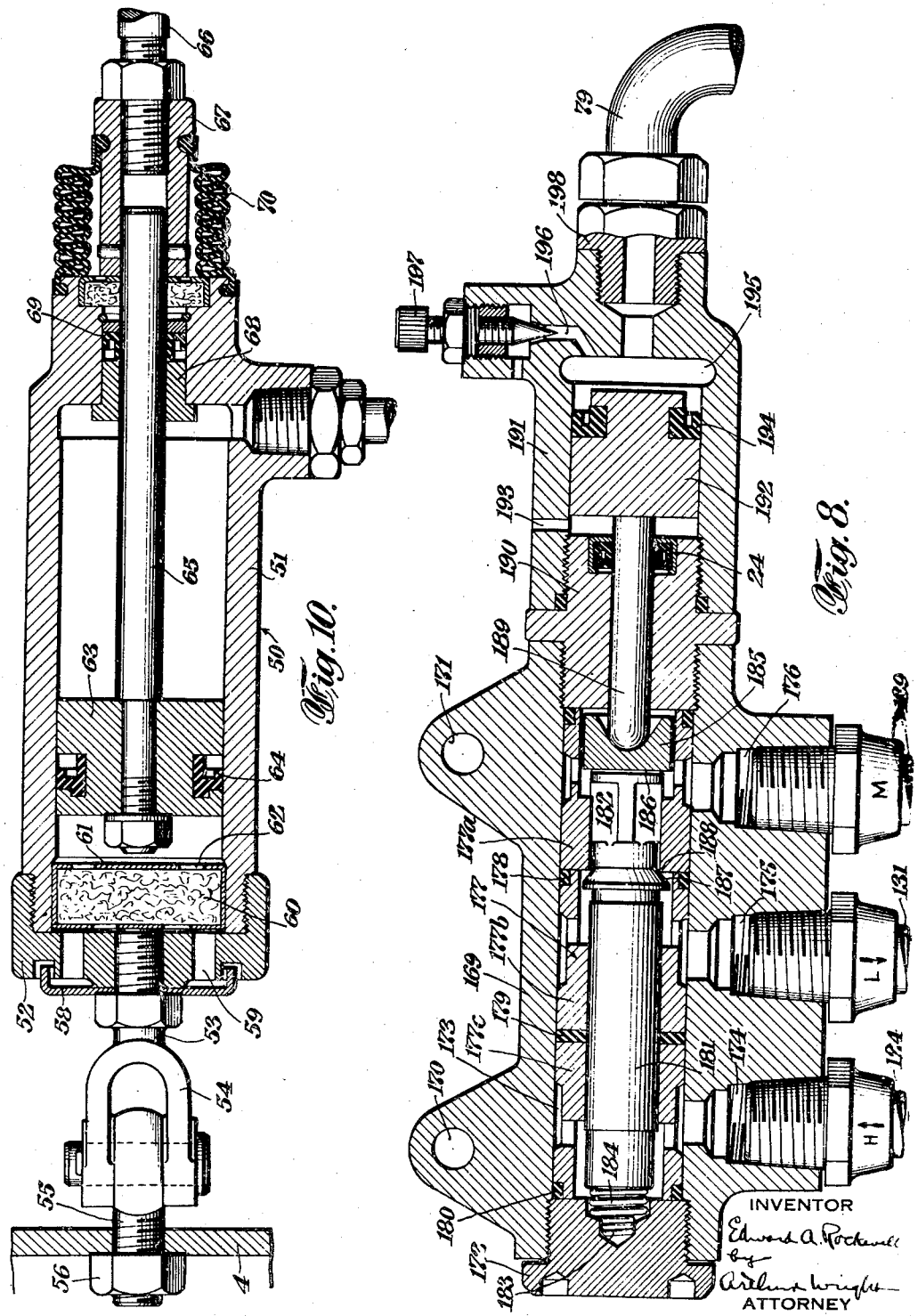

Patented Apr. 8, 1947

2,418,666

UNITED STATES PATENT OFFICE 2,418,666

POWER UNIT SYSTEM FOR APPLYING BRAKES

Edward A. Rockwell, West Hartford, Conn.

Original application November 25, 1938, Serial No. 242,255, now Patent No. 2,244,317, dated June 3, 1941. Divided and this application May 7, 1941, Serial No. 392,216

32 Claims. (Cl. 188—152)

My invention relates particularly to a power unit brake system whereby the brakes may be applied to wheels of an automobile or other parts of automotive vehicles, so as to attain certain advantages in the control of the brakes in the use of the automobile.

The present application is a division of my copending application upon Hydraulic power system, Ser. No. 242,255, filed November 25, 1938, Patent No. 2,244,317, granted June 3, 1941.

An object of my invention is to provide a power unit system of the above character whereby certain advantages may be obtained in the application of the brakes thereof, owing to the fact that when the manual control of the brakes is not being applied the power unit thereon will automatically apply the braking action. This is advantageous especially in the parking of the automobile. Another object is to enable the brakes to be applied automatically in this way on some of the wheels, thus making it unnecessary to apply the brakes for parking purposes by the usual manual force applied in the operation of the brakes. One of the objects of this arrangement is to enable the brakes to be applied in parking to some of the wheels while not requiring the brakes to be applied to the remaining wheels, although the apparatus is constructed so that in the normal operation of the same the brakes may be applied, if desired, to all four wheels of the automobile. A further object is to provide a construction in which an effective power unit is provided for these purposes and which, when thrown out of manual control, automatically applies the brakes to the wheels connected thereto so that it is not necessary, during the parking of the automobile, to leave the manual control in the position in which it applies the manual force for the actuation of the brakes. In other words, in accordance with my invention, by merely throwing off the manual control of the power unit the latter is adapted to actuate the brakes to any number of the wheels to which it is connected. This construction adds greater safety in the operation and parking of the automobile, particularly on inclines. Still another object is to provide an improved reverse-modulating valve.

While my invention is capable of embodiment in many different forms, by way of illustration I have shown only certain embodiments thereof in the accompanying drawings, in which—

Fig. 1 is a diagrammatic elevation of a hydraulic system made in accordance with my invention;

Fig. 2 is a side elevation showing the main hydraulic actuating valve;

Fig. 3 is a vertical section through the same;

Fig. 4 is a longitudinal horizontal section through the booster used therein;

Fig. 5 is a longitudinal vertical section through the relay valve structure therein;

Fig. 6 is a plan view of the same;

Fig. 7 is a horizontal longitudinal section of the automatic pack device contained therein;

Fig. 8 is a longitudinal section of a modified form of the relay valve structure which can be used instead of the relay valve shown in Fig. 5;

Fig. 9 is a perspective view of the tubular valve thereon; and

Fig. 10 is a cross-section of a hydraulic mechanical operating unit.

In the form of my invention shown in the accompanying drawings, I have illustrated a frame 1 of an automobile chassis or carriage, comprising two longitudinal U-beams 2 and 3 and a transverse U-beam 4. Mounted on the chassis of the automobile, at any desired point accessible to the driver, there is provided a manual control device such as a foot-pedal lever 5 having a valve operating rod 7 pivotally connected at 6 to said lever and which, at the other end, is screw-threaded into a valve-operating yoke 8, locking screws 9 being provided to secure the rod 7 and yoke 8 together, which is pivotally mounted on a rear link 10 and a front valve operating or controlling element such as a link and lever 11 which are pivotally carried in a bifurcated bracket 12 which in turn is screw-threaded at its rear end to a brake-operating rod 13, a locking nut 14 being provided to tighten the bracket 12 on the brake rod 13. The link 10 and lever 11 provide for longitudinal movement of the yoke 8 when operated by the foot-pedal lever 5. The bracket 12 is, furthermore, secured by bolts 15 and 16 to a hydraulic pressure-applying device having a valve housing 17. At its forward end the valve housing 17 has screw-threaded into the same a cap 18 provided with a central opening 19 to receive a plunger 20 which abuts against the end of the lever 11. A rubberboot 21, to prevent the access of dirt, is received at one end in a recess 22 in the cap 18 and at the other end in a recess 23 in the plunger 20. An annular rubber seal 24, such as is shown in Fig. 8, U-shaped in cross section, is also carried in the cap 18 around the plunger 20 to prevent the leakage of low pressure hydraulic fluid from the valve structure. At its rear end the plunger 20 is received in a slidable head 25 carried within a fourpiece cylindrical shell 26 having composite parts 26a, 26bm, 26c and 26d, separated by rubber seals 26e, 26f and 26g, within the valve housing 17, the composite cylindrical shell 26 having, also, terminal rubber seals 26h and 26i. The slidable head 25 is normally urged in a forward direction by means of a spring 27 which abuts against the same, and after passing through the valve structure is seated within a rear cap 28 screw-threaded in the valve housing 17. Also seated in the rear cap 28 there is a larger and stronger spring 29 which, at its other end, abuts against a shoulder 30 on the interior of a tubular valve 31 located within the cylindrical shell 26, the said valve 31 having at its forward end a slightly flattened valve seat 32 adapted to contact, when closed, with the slidable head 25. The edge of this end of the tubular valve 31 is provided with a chamfered portion 33 so that, as a result, the flattened valve seat will have a diameter which is somewhat less than the diameter of the rear portion of the tubular valve 31 to prevent the hydraulic pressure from pushing the slidable head 25 off said valve seat. However, this diameter of the flattened valve seat 32 is not made much smaller than the diameter of the rear end of the tubular valve 31, so as thus to avoid requiring the head 25, and therefore the foot-pedal 5, to change the foot pressure too much in the decreasing or off modulation control.

The valve housing 17 has a high pressure inlet 34 for hydraulic liquid under any desired pressure, which may be, for example, 500 to 1000 lbs. per square inch, and is provided with a low pressure hydraulic liquid outlet 35 and a modulating pressure port 36 for modulated pressure to be supplied for operating the brake or other automobile accessory. The high pressure hydraulic liquid, after entering the port 34, is received in an annular passageway 37 in the exterior of the cylindrical shell 26c and which is connected by a port 38 to an internal annular passageway 39 which extends to the front end of the shell 26c so as to end in an annular valve seat 40 on the rear of the end of the shell 26b, the edge of the said valve seat 40 being slightly smaller in diameter than the diameter of the rear end of the tubular valve 31 so as to insure a positive closing of the tubular valve 31 against said valve seat. On the exterior of the tubular valve 31 there is a tapered valve surface 41 cooperating with said valve seat 40 to thus provide a valve which is normally closed to prevent the entry of the high pressure liquid. When, by the movement of the pedal lever 5, the sliding head 25 is moved to the rear to close the valve against the valve seat 32 and thereafter unseat the valve 41 from the seat 40, the high pressure fluid will then have access through an annular passageway 42 and ports 43 to a longitudinal passageway 44 in the interior of the tubular valve so that the high pressure liquid can then have access to the rear end of the tubular valve 31 and thence to an internal annular passageway 45, radial ports 46 and an external annular passageway 47 in the shell 26d to the modulating pressure port 36. The modulating pressure thus applied through the port 36 passes by a controlling means including a flexible rubber tube 48 conveying the unyielding fluid to a port 49 in a previously known mechanical operating unit or power device 50. This is of any desired construction but may, for example, be comprised of a cylinder 51 having a head 52 secured by a bolt 53 and yoke 54 to a pivot 55 mounted on the U-beam 4 of the chassis and to which it is secured by a nut 56. On the bolt 53 there is a baffle 58 on the exterior of the head so as to provide access of air to the ports 59 in said head, which lead into the cylinder 51 having a horsehair packing 60 carried in an enclosure 61 having air openings 62, so as thus to permit the access of air to the cylinder while separating dust therefrom. In the cylinder 51 there is a piston 63 having a rubber seal 64, said piston 63 being connected by a piston rod 65 to a brake rod 66 by means of a screw-threaded connecting member 67. Around the piston rod 65 there are the usual bushing 68, rubber seal 69 and rubber boot 70, the ends of which are connected, respectively, to the cylinder 51 and the connecting member 67. This construction is also described in my co-pending application upon Apparatus for controlling the application of power, Ser. No. 241,312, filed November 19, 1938, now Patent No. 2,276,418, March 17, 1942.

The brake-operating rod 13 leads to the upper end of a lever 71 having a pivot 72 and the lower end is connected by a slotted member 73 to the rod 66. The pivot 72 is comprised of a shaft 74 on which the lever 71 is tightly secured, which extends into a Loughead master cylinder 75, which is an actuating means designed for converting mechanical movement into hydraulic pressure, the details of which form no part of the present invention, and which are utilized as disclosed in the Loughead et al. Patent No. 1,707,063, granted March 26, 1929. The hydraulic pressure produced by the Loughead master cylinder 75 is conveyed by a pipe 76 to a part to perform work or an accessory such as a pair of front wheel brakes 76a on wheels 76b through branch pipes 77 and 78 for the actuation of the front wheel brakes in the usual way. As will be noted, the booster 50 may add additional power to the manual power applied to the lever 71 by means of the rod 66.

The modulated pressure delivered by the pipe 48 is also arranged to be conveyed by a pipe 79 to a relay valve 80 through a port 81. The said relay valve 80 is comprised of a casing 82 to the forward end of which there is screw-threaded a shell 83, by means of a coupling member 83a, having a screw-threaded closure 84 arranged to receive a manual actuating rod 85 connected to a head 86 in a sliding sleeve 87 having a venting port 88 adapted to pass over a venting port 89 in the shell 83, these ports 88 and 89 being merely breather openings. The sliding sleeve 87 has at its rear end a vented closure 90 for receiving a valve actuating rod 91 around which there is a spring 92 held on the rod 91 by a retainer washer 93 and a nut 94. The said rod 85 is connected by a yoke 95 and a pin 96 to a spring 97 which in turn is connected by a clamping member 98 to an emergency brake-operating rod 99 connected to an adjustable manual control device such as a hand lever 100 having a pivot 101 at any desired point on the automobile chassis, operable independently of the valve operation from the hydraulic connection 79 and for manually adjusting the braking effect on the rear wheels and thus applying a varying ratio of the fluid pressure coordinated to the variable fluid pressure applied to the front wheel brakes 76a.

The rear end of the rod 91 has an enlargement 102 which cooperates with a transverse forward stop 103 in the sleeve 87 and provides an abutment for receiving at the rear thereof a hydraulic valve-operating plunger 104 tightly mounted on a reduced portion 108 of the rod 91, having a rubber seal 105 at its forward end. The inlet for the modulated pressure 81 is in the chamber, which is in the rear of the plunger 104, so as to move the plunger 104 in opposition to the high pressure hydraulic liquid conveyed to the other side of the plunger 104 by a passageway 106 which communicates with a high pressure liquid inlet 107 on the valve casing 82. The rear end of the chamber formed by the plunger 104 is closed by a rubber sealed partition 108 through which the reduced portion 109 at the rear end of the rod 91 passes so as to abut against a reaction-responsive hydraulically moved modulating relay supply or control valve having a valve member 110 reciprocable within an annular member 111 having ports 112 communicating with an annular passageway 113 communicating with a low pressure or return inlet 114. The said valve member 110, which may be, thus, controlled by the hand lever 100, has a flat face 115 which is adapted to seat against a valve seat 116 on a tubular valve member 117 which is constructed the same as the tubular valve member 31 previously described. This tubular valve member has a tapered valve element 118 which cooperates with a valve seat 119, the same as in the case of the valve 31 previously described. This valve, through transverse ports 120, gives access for the high pressure liquid to the interior of the tubular valve 117 from an annular passageway 121, ports 122, a passageway 123 and the high pressure liquid inlet 107. The high pressure liquid supplied to the port 107 is received from a pipe 124 and the said high pressure liquid is received by the inlet 34 from a pipe 125 having a flexible rubber connection 125a, both of which pipes lead to a high pressure supply reservoir 126 supplied from a source of power such as a rotary pump 127 driven by an electric motor 128, pressure within the pressure chamber 127 being maintained substantially uniform by means of an accumulator 129 having a series of coil springs acting on a plunger at one end of the high pressure chamber 126. The details of the structure of the accumulator 129, reservoir 126, pump 127 and electric motor 128 do not constitute part of the invention of the present application but are shown in detail in my Patent No. 2,197,772, granted April 23, 1940, as well as my Patent No. 2,136,638, granted November 15, 1938. The low pressure or exhaust liquid discharged by the port 114 is conveyed by a pipe 131 to the low pressure side of the accumulator 129 and the same is true with regard to the low pressure liquid discharged from the port 35 which is conveyed by a pipe 132 having a flexible rubber connection 132a also to said low pressure side of the accumulator 129. The low pressure side of said accumulator is furthermore connected to a filler pipe 133 which leads to a filler reservoir 134 having a pipe 135 connected by a filler pipe 136 to the top of the Loughead master cylinder 75 and by a pipe 137 connected in turn to the low pressure pipe 131.

The high pressure liquid normally keeps the valve 115, 116 closed and the valve 118, 119 open due to the high pressure liquid in the passageway 106 forcing the plunger 104 to the right in Fig. 5, which causes the rod 109 to seat the valve member 110 on the valve seat 116 and push the tubular valve member 117 to the right, so that the high pressure liquid passes through the valve 118, 119, through the ports 120 and thence through the interior of the tubular valve 117 and out through a coupling member 138 and a pipe 139 to a port 140 on a fully enclosed differential pressure automatic spring pack device or unitary power unit 141 provided as a safety feature and which automatically applies the brakes on the failure of the liquid pressure, and which is mountable on the carriage 2 without thrust therefrom and independently of any fixed position of the unit with regard to the power connection 137 or the brakes. This automatic pack 141 is comprised of a portion having a hydraulic pressure chamber in a second casing member 142 closed at both ends in which the pressure liquid operates on the forward face of a differential power-applying movable wall or piston or plunger 143 and in opposition to a series of pressure accumulating springs 144, so as to retract the same, which normally press the piston 143 forwardly to bring the accessory into operation by applying the brakes. Also, these springs 144 will apply pressure to operate the brakes irrespective of the fluid pressure, while resisting the manual means coordinately to the power exerted. The said piston 143 has a cylindrical reduced extension 145 which is connected by a screw 146 to a slidable spring-retaining plate 147 on which the springs 144 are supported at one end thereof. Guide tubes 148 pass through the springs 144 and through the plate 147, said tubes being held in place by rods 149 passing through said tubes and screw-threaded at one end in the casing of the chamber 142. At this end centering members 150 on said rods keep the tubes 148 in place and at the rear end centering plates 151 on said rods also act as abutments for the springs 144. The rods 149 at this end pass through a head 152 which, by means of nuts 153 on the rods 149, hold an enclosing shell 154 in place. On the forward face of the said piston 143 there is a piston rod 155 which extends through a packing 156 against a plunger contained in another portion or first casing member of the power unit having a pressure-applying Loughead master cylinder 157 and constructed the same as in the Loughead patent above referred to and as shown in the said Loughead patent, except that in this instance, instead of a lever actuation of the Loughead cylinder the end of the piston rod 155 abuts against a work-performing or force-applying fluid actuating piston or plunger 158 in the said Loughead cylinder, the same as the usual plunger contained in the master cylinder 75 above referred to and in the said Loughead patent. The plungers 143 and 158 act as a pressure-increasing plunger due to their relative areas, so as to deliver a higher hydraulic range of pressures by the latter. The hydraulic liquid for the control of the rear brakes 161a, by transmitting the spring action thereto, passes out of the Loughead master cylinder 157 through a port 159 and thence by a connection including branch pipes 160 and 161 to the operating parts of a part to perform work or an accessory, such as the rear wheel brakes having brake cylinders 160a with pistons 160b on wheels 161b by which I mean to refer, of course, to any wheels located towards the rear and having brakes controlled by the manual means 5. In case of emergency, should it be desired to release the brakes when they are on, due, for example, to the failure of the hydraulic pressure in the pipe 139 and due to the pressure received from the spring device by the port 159, there may be provided for such emergency a manually controlled by-pass pipe 162 leading from the port 159 to the interior of the Loughead master cylinder 157, that is to say to a point outside of the plunger 158. This by-pass pipe 162 can be provided with an operating valve 163 comprising a valve plunger 163a adapted to be opened by a bell-crank lever 164 and a Bowden wire 165 leading to a manually operable pull-knob 166 on the dash 167 of the automobile. This will throw the rear wheel brakes 161a out of operation.

In Figs. 8 and 9 I have shown a modified form of the relay valve structure which, however, operates in substantially the same manner as the relay valve structure shown in Fig. 5, although the valve parts in this instance are somewhat simpler in construction. In the form of my invention shown in Figs. 8 and 9 there is a relay valve housing 169 having holes 170 and 171 thereon for attachment of the housing to any desired part of the chassis of the automobile. At its forward end there is a screw-threaded cap 172 closing a longitudinal bore 173 within the housing in which the valve parts are carried. Said housing, furthermore, at this end, carries three ports 174, 175 and 176 which are provided for connection, respectively, to the pipes 124, 131 and 139. Within the bore 173 there is located a three-piece cylindrical shell 177 having component parts 177a, 177b and 177c provided with gaskets 178, 179 and 180, the construction of these parts of the shell and gaskets being the same as in the form of my invention shown in Fig. 3, except in this instance the parts 26a and 26b are combined to form the part of the shell 177a. Within the composite shell 177 there is a tubular valve 181 which is constructed the same as the tubular valve 31 previously described except that in this instance the holes 43 are omitted and four flat areas 182 are located near the end of the valve shown at the right of the tubular valve in Fig. 9. Also, in this instance, within the tubular valve 181 there is a spring 183 of small diameter and a large spring 184, which springs are arranged and operate like the springs 27 and 24 previously described. The smaller spring 183 normally keeps open a flat valve member 185 cooperating with the adjacent end of the tubular valve 181 to keep the valve member 185 normally away from its seat 186 on this end of the tubular valve, constructed the same as the valve seat 32 previously described. Intermediate its ends the tubular valve 181 has an annular tapered valve member 187 constructed the same as the valve member 41 previously described and which cooperates with a valve seat 188 arranged the same as the valve seat 40 previously described. The forward end of the tubular valve 181 leads to the high pressure port 174, the intermediate valve 187, 188 controls communication with the low pressure port 175, and the valve 185, 186 controls communication between the interior of the tubular valve 181 and the modulated pressure port 176. The position of the valve element 185 is controlled by a plunger 189 passing through an end closure 190 screw-threaded in the housing 169, the said closure 190 acting as a coupling for connecting the housing 169 with a cylinder 191 to which it is screw-threaded, said cylinder having a piston 192 therein to which the plunger 189 is connected. A vent 193 is provided in the cylinder 191 at the forward end of the piston 192. At the rear end of the piston 192 there is a U-shaped rubber sealing member 194 to seal a chamber 195, which has a bleeder opening 196 closed by a screw-plug 197 which can be removed when desired to permit the escape of accumulated air from the chamber 195. The said chamber 195 is connected by a screw coupling 198 to the pipe 79.

In the operation of the apparatus, referring first to the embodiment of my invention shown in Figs. 1 to 7, the system having been supplied with the required hydraulic brake fluid through the filler tank 134, the apparatus is ready for the operation of the brakes in the control of the automobile.

It will be noted that the hydraulic brake fluid, which is of any desired character, is supplied by the filler tank 134 to the Loughead booster 75 as well as the Loughead brake-operating element 157 which is connected to the automatic pack 141 and also the low pressure reservoir accumulator 129, and the said tank 134 receives the returned low pressure liquid through the pipe 131 from the control or relay valve 80 as well as from the low pressure outlet 35 on the main modulating valve. When the brakes are to be operated, the pedal-lever 5 is moved downwardly to the extent desired and thereby the desired amounts of a modulated high pressure liquid are allowed to pass by the valve 40, 41 and thus conveyed by the pipe 48 to operate the brakes, and which is coordinated in extent to the amount or the degree of the pressures exerted manually on the pedal-lever 5. When this takes place the liquid received by the accumulator 129 placed under high pressure by the pump 127, is delivered by the pipe 125 therefrom and the outlet valve 25, 32 having been closed and the high pressure inlet valve 40, 41 having been opened manually, the said liquid passes from the port 34 through openings 38, openings 43 and passageway 44 to the chamber 45 where the building up of the liquid pressure on the end of the tubular valve 31 will close the valve 40, 41 unless further liquid is being admitted by increasing manual pressure on the plunger 20. In this way, although power derived from the high pressures is applied to the brakes, the amount of the same is determined by the feel which reacts on the foot through the pedal lever 5. It will be noted, furthermore, that by applying the manual pressure to the pedal-lever 5 the front brakes are applied manually in any event due to the mounting of the valve casing 17 on the brake-rod 13 and which applies hydraulic pressure from the Loughead master cylinder 75 to the front brakes 76a. This effect is, however, boosted by reason of the modulated pressure delivered through the pipe 48 to the hydraulic booster 50 and thence to the lever 71 on the Loughead master cylinder 75. This modulated pressure derived from the pipe 48 is furthermore conveyed by the pipe 79 to the control or relay valve 80. The latter is in one form of actuation, connected to the emergency brake hand-lever 100 in that thereby a pull on the rod 91 through the interposed spring 92 will result in the piston 104 moving to the left to open the valve 115 as shown in Fig. 5, which is normally shut, due to the relatively large size of the piston 104, by the high pressure liquid from the passageway 106 moving the piston 104 to the right, and which valve 115, 116 communicates with the low pressure outlet 114 so as to close the normally-open high pressure inlet valve 118, 119, thus permitting to the extent desired the modulated escape of the high pressure liquid through the low pressure outlet 114 from the pipe 139 leading from the automatic pack 141. Instead of such manual actuation from the emergency brake lever 100, however, the modulated high pressure supplied through the pipe 79 and 48 from the modulating valve 40, 41 supply of liquid to the chamber 45 can similarly act on the face of the piston 104 to bring about the modulated pressure control and operation of the said automatic pack 141 and the rear brakes 161a connected thereto. The modulating valve 31, and accordingly the modulating relay valve 117, thus control the position of the plunger travel of the piston 143 coordinately with the variations of the pressure of the liquid delivered by said plunger or piston 158. This is accomplished by moving the piston 143 by the increase of volume and pressure of the liquid from the inlet 139 to coordinately control the position of the piston 143 according to said increase of volume. In this operation, the change by increments or decrements of the pressures established hydraulically on the right face of the piston 104 controls the opening of the outlet valve 115, 116 and closing of the inlet valve 118, 119. When the valve 118, 119 is closed and the valve 115, 116 opened the liquid passes out from the pipe 139 through the valve 115, 116 to the pipe 131 and back to the accumulator. When the brakes are being applied at a given degree both of the valves 115, 116 and 118, 119 are closed as the decrease of the pressure in the pipe 139 permitted by the particular pressure on the right face of the piston 104 will continue until the lessened pressure on the face of the valve member 110 causes the pressure on the left face of the piston 104 to move the valve member 110 into closed position. In other words, the tubular valve member 117 operates similarly to the valve member 31 but in the reverse order. It will be noted, however, that either of these types of actuation of the control or relay valve 80 results in a reverse modulation, that is to say in pressure conditions within the pipe 139, which are inversely proportioned or related to the modulated pressure in the pipe 79. In other words, as the pressure admitted through the pipe 79 increases, the pressure within the pipe 139 decreases and the pressure in the pipes 160, 161 increases. This enables a safety control or operation of the rear brakes to be attained by reason of the fact that the springs 144 normally press the rear brakes into action through the agency of the Loughead master cylinder 157 which conveys the resultant hydraulic pressure thereto through the pipe 159, and when there is no manual actuation from the emergency lever 100 nor from the application of modulated high pressure through the pipe 79, the high pressure liquid which is supplied from the pipe 124 normally acts on the front end of the piston 104 to keep the valve 115, 116 closed and the valve 118, 119 open, admitting the maximum high pressure through the pipe 39 to the interior of the cylinder 142 so as to force the springs 144 in a direction keeping the rear brakes in off-position. The rear brakes are thus applied to the extent desired by releasing the high pressure in the pipe 139 to the extent desired from the pipe 139 so that the released liquid passes out through the low pressure outlet pipe 131 back into the filler system. In other words, if there is a breakage or failure of the hydraulic system the rear brakes are automatically thrown into action so as to apply the brakes. If this should occur the rear brakes can be thrown off manually, if desired, by the actuation of the bell-crank lever 164 from the handle 166 on the dash, the effect of which is to release the hydraulic brake fluid from the port 159 so as to allow it to enter the reservoir which forms a part of the Loughead master cylinder 157.

The modification of my invention shown in Figs. 8 and 9 is a modification of the control or relay valve 80. The operation of this modified form of control or relay valve is substantially the same as in the operation of the control or relay valve 80 except that in this instance, for simplicity, there is shown no emergency brake manual control connected thereto. A further difference in this instance is that the valve 185, 186 is normally open while the valve 187, 188 is normally closed. Consequently, in this instance the high pressure brake fluid which normally keeps the rear brakes 161a in off-position is received through the pipe 139 leading to the automatic pack from the high pressure pipe 124 and the interior of the valve 181. Upon actuation of the valve 181 by the modulated high pressure liquid received from the pipe 79 the valve 185, 186 is closed and the valve 187, 188 is opened so that the amount of the high pressure brake fluid desired to be released is carried away through the low pressure exhaust pipe 131.

It will be understood that in all of these modulator valve constructions 17, 83 and 169 the modulating effect described in the previously described operation herein takes place, except that in the valves 80 and 169 there is an inverse modulating effect obtained. These actions of the three valves so as to obtain a modulated effect by the admission or release of small increments of the brake fluid to the extent desired, in order to obtain the desired degree of high pressure in the on-modulation, can take place likewise and with the same effectiveness in the off-modulation and in an entirely comparable and similar manner. In this way, the on-modulation the increasing increments of modulating fluid obtain increasing brake pressures in accordance with the amount of manual pressure applied but at very much higher pressures than the manual pressure itself, and in the off-modulation by decreasing pressures applied as desired manually, corresponding but very much higher decreasing pressures are obtained on the brakes at will until they are finally entirely released. At all times, however, the reaction on the foot, through the lever 11 and pedal 5, of the amount of high pressure liquid manually admitted produces from the chamber 45 on the head 25 a feel, that is to say an amount or reaction pressure coordinate to the extent to which the brakes are being applied. This amount of high pressure liquid applied to actuate the brakes can be changed manually by increments in the on or off modulation, as desired, to change the braking effect, but while the brakes are on after each admission or discharge of an amount of the high pressure liquid, the valves 25, 32 and 40, 41 remain closed until a further change in the amount of high pressure liquid present is made manually by the pedal 5.

While I have described my invention above in detail I wish it to be understood that many changes may be made therein without departing from the spirit of the same.

I claim:

1. In combination, a spring device, an accessory operating connection adapted to be brought into action thereby, hydraulic means for retracting said spring, fluid means interposed between the spring device and the accessory operating connection for conveying the spring action to said accessory operating connection, and a manually actuated by-pass for relieving the fluid conveyed to the accessory operating connection upon the failure of said hydraulic means.

2. In combination, a spring device having a fluid actuating piston, an accessory operat'ng connection adapted to be brought into action thereby, hydraulic means for retracting said spring, fluid means interposed between the spring device and the accessory operating connection for conveying the spring action to said accessory operating connection, and a manually actuated by-pass for relieving the fluid around said piston, conveyed to the accessory operating connection upon the failure of said hydraulic means.

3. A fluid pressure brake-operating system comprising a manual control device, a set of front wheel fluid pressure brake connections connected to the manual control device, a set of rear wheel fluid pressure brake connections connected to the manual control device, means adapted to apply a variable braking force to one of said sets of brake connections to accordingly vary the extent of the force applied to the other set of brake connections, and a manually operable device adapted to adjustably control the force applied to one of said sets of brake connections.

4. A hydraulic brake operating system comprising a manual control device, a set of front wheel brake-connections connected to the manual control device, a set of rear wheel brake connections connected to the manual control device, a spring pack power unit adapted to normally apply braking force to one of said sets of brake-connections by the spring force of said unit, and a manually operable device adapted to throw out of operation the control by the manual control device of one of said sets of brake-connections while leaving operative the connection between the manual control device and the other set of brake-connections.

5. A hydraulic pressure brake-operating system comprising a manual control device, a set of front wheel hydraulic pressure brake connections connected to the manual control device, a set of rear wheel hydraulic pressure brake connections connected to the manual control device, means adapted to apply a variable braking force to one of said sets of brake connections to accordingly vary the extent of the force applied to the other set of brake connections, said means including a hydraulic valve, and a manually operable device operatively connected to the hydraulic valve, adapted to adjustably control the force applied to one of said sets of brake connections.

6. A hydraulic brake operating system comprising a manual control device, a set of front wheel brake-connections connected to the manual control device, a set of rear wheel brake connections connected to the manual control device, a spring pack power unit adapted to normally apply braking force to one of said sets of brake-connections by the spring force of said unit, and a manually operable device adapted to throw out of operation the control by the manual control device of one of said sets of brake-connections while leaving operative the connection between the manual control device and the other set of brake-connections, said last mentioned set of brake-connections leading to the power unit being adapted to be controlled by said manually operable device.

7. A hydraulic brake operating system comprising a manual control device, a set of front wheel brake-connections connected to the manual control device, a set of rear wheel brake connections connected to the manual control device, a power unit adapted to normally apply braking force to one of said sets of brake-connections, and a manually operable device adapted to throw out of operation the connection between the manual control device and one of said sets of brake-connections while leaving operative the connection between the manual control device and the other set of brake-connections, said last mentioned set of brake connections having a master cylinder with a by-pass thereon leading to the power unit adapted to be controlled by said manually operable device.

8. A hydraulic brake operating system comprising a manual control device, a set of front wheel brake-connections connected to the manual control device, a set of rear wheel brake connections connected to the manual control device, a spring pack power unit adapted to normally apply braking force to one of said sets of brake-connections by the spring force of said unit, and a manually operable device adapted to throw out of operation the connection between the manual control device and one of said sets of brake-connections while leaving operative the connection between the manual control device and the other set of brake-connections, said last mentioned set of brake connections having a master cylinder with a by-pass thereon leading to the power unit adapted to be controlled by said manually operable device.

9. A hydraulic brake operating system comprising a manual control device, a set of front wheel brake-connections connected to the manual control device, a set of rear wheel brake connections connected to the manual control device, a power unit adapted to normally apply braking force to one of said sets of brake-connections, and a manually operable device adapted to throw out of operation the connection between the manual control device and one of said sets of brake-connections while leaving operative the connection between the manual control device and the other set of brake-connections, said last mentioned set of brake connections having a master cylinder with a by-pass thereon leading to the power unit, having a valve in said by-pass, adapted to be controlled by said manually operable device.

10. A hydraulic brake operating system comprising a manual control device, a set of front wheel brake-connections connected to the manual control device, a set of rear wheel brake connections connected to the manual control device, a spring pack power unit adapted to normally apply braking force to one of said sets of brake connections by the spring force of said unit, and a manually operable device adapted to throw out of operation the connection between the manual control device and one of said sets of brake-connections while leaving operative the connection between the manual control device and the other set of brake-connections, said last mentioned set of brake connections having a master cylinder with a by-pass thereon leading to the power unit, having a valve in said by-pass, adapted to be controlled by said manually operable device.

11. A power unit comprising an enclosing casing for accumulating pressure therein, having a hydraulic pressure-applying plunger in said casing for transmitting accumulated pressure remotely from the power unit for work performance and having a spring and piston therefor associated therewith, said plunger having operatively connected thereto a rod operatively connecting the spring with the plunger in the enclosing casing, a hydraulic inlet chamber through which the rod passes, a hydraulic pressure inlet provided with a valve for controlling the accumulation of said pressure and the application of said pressure for work performance throughout the range of said pressure, and a cylinder for the plunger having a hydraulic seal adjacent to the chamber and the rod.

12. In a braking system, hydraulic brake operating means including a master cylinder, a brake pedal, means connecting the pedal and the master cylinder so as to operate the master cylinder irrespective of the application of power, including a hydraulic pressure delivering device, a power device connected to said connecting means to act on said master cylinder, and means for controlling the power device having an element responsive to the pressure in the pressure delivering means and effecting the operation of the controlling means, said controlling means being constructed and arranged to react on the brake pedal, by an unyielding fluid between them, in proportion to the effective power of the power device.

13. A braking system for an automobile having front and rear wheels provided with sets of brakes for the front and rear wheels, respectively, said braking system being connected to the front and rear wheels, a pedal on the automobile, means for actuating the automobile brakes on one set of wheels, including a master cylinder, means connecting the pedal with the said actuating means, by an unyielding fluid between them, having interposed therein a hydraulic pressure delivering device, a differential pressure power cylinder for actuating the second set of wheel brakes, and a control valve for the power cylinder which is actuated by the pressure that has been received from the pressure delivering means.

14. In combination, an automotive vehicle having a carriage therefor, an automotive accessory, a power unit for actuating the same, located remotely therefrom, manual means remote from the power unit, including a hydraulic pressure-delivering device for controlling the operation of the accessory, a source of power remote from the power unit and means for bringing the accessory into operation by accumulated power within the unit, irrespective of the further accumulation of power from said source, fluid pressure connections from the said delivering device to the power unit and from the unit to the accessory for operating the latter accompanied by resisting the manual means coordinately to the power exerted on the accessory, the connection from the delivering device to the power unit, having a plunger therein adapted to be moved by the liquid from the pressure-delivering device so as to operate the power unit, the said power unit being constructed to be mountable on the carriage to operate thereon without thrust therefrom, with relation to the carriage in the manual operation of the power unit and the operation of the accessory from the power unit.

15. In combination, an automotive vehicle having a carriage therefor, an automotive accessory, a power unit for actuating the same, located remotely therefrom, manual means remote from the power unit, including a hydraulic pressure-delivering device for controlling the operation of the accessory, a source of power remote from the power unit and means for bringing the accessory into operation by accumulated power within the unit, irrespective of the further accumulation of power from said source, fluid pressure connections from the said delivering device to the power unit and from the unit to the accessory for operating the latter accompanied by resisting the manual means coordinately to the power exerted on the accessory, the connection from the delivering device to the power unit, having a plunger therein and a valve operated by the plunger, adapted to be moved by the liquid from the pressure-delivering device so as to operate the power unit, the said power unit being constructed to be mountable on the carriage to operate thereon without thrust therefrom with relation to the carriage in the manual operation of the power unit and the operation of the accessory from the power unit.

16. An apparatus of the character described, comprising a power unit for the operation and control of an automotive accessory, a source of fluid pressure, and manual means including a hydraulically moved modulating supply valve for controlling the application of said fluid pressure to the power unit, a connection in communication with the source of fluid pressure and the unit, a hydraulic connection from the unit to the accessory, and a hydraulic connection from the manual means to the supply valve for the control of the unit and the accessory subject to a reaction through the hydraulic connections on the manual means from the accessory, said unit including means for the application of hydraulic pressure to the accessory in the event of the failure of the pressure from the fluid pressure source and said unit being operable without thrust from any mounting of the automobile accessory and the other connections.

17. An apparatus of the character described, comprising a power unit for the operation and control of an automotive brake, a source of fluid pressure, and manual means, including a hydraulically moved modulator supply and release valve, for controlling the application of said fluid pressure to the power unit, a connection from the source of fluid pressure and the unit, a hydraulic connection from the unit to the brake, and a hydraulic connection from the manual means to the supply valve for the control of the unit and the brake subject to a reaction through the hydraulic connections on the manual means from the accessory, said unit including means for the application of hydraulic pressure to the brake in the event of the failure of the pressure from the fluid pressure source and said unit being operable without thrust from any mounting of the automobile brake and the other connections, the brake having a hydraulically operating piston for reaction on the modulator valve.

18. In combination, a power unit, a hydraulic inlet connection controlling the power unit by the variation in the hydraulic pressure therein, a differential pressure plunger in said unit, having two coacting pressure areas for high and low pressure respectively, one of which areas is controlled by the hydraulic pressure received from said hydraulic inlet, a hydraulic outlet connection on said unit, and a modulator valve having a plunger, with two independently operable actuating means therefor, connected to the hydraulic inlet for the control of the differential pressure plunger.

19. A power unit for the operation and control of a part to be moved comprising a manually operable hydraulic mechanism for controlling the unit, a source of fluid pressure connected to the unit, a hydraulic connection from the unit to said part, and a hydraulic connection from the manually operable hydraulic mechanism to the unit for the control of the unit, said unit including means for the application of hydraulic pressure

15 to said part in the event of the failure of the pressure from the fluid source, and said unit being adapted for mounting in a position substantially independent of any fixed positions of the connection from a source of fluid pressure and the connection from the unit to said part.

20. A power unit for the operation and control of a part to be moved comprising a manually operable hydraulic mechanism, including a modulator valve means having a hydraulic piston for reaction on the valve means, for controlling the unit, a source of fluid pressure connected to the unit, a hydraulic connection from the unit to said part, and a hydraulic connection from the manually operable hydraulic mechanism to the unit for the control of the unit, said unit including means for the application of hydraulic pressure to said part in the event of the failure of the pressure from the fluid source, and said unit being adapted for mounting in a position substantially independent of any fixed positions of the connection from a source of fluid pressure and the connection from the unit to said part.

21. A unitary power device, having two portions connected together, one portion having a hydraulic cylinder and piston therein, and the other portion a force-applying plunger and cylinder, said unit having hydraulic inlet and outlet connections, leading to said portions respectively, for the control and operation of the unit, including means for communicating fluid pressure for the power operation of the same, a manually controlled valve on the inlet having a reaction from said outlet, and means, including a rod directly connecting said piston and plunger, interrelated to both the hydraulic inlet and hydraulic outlet connections determining the extent of movement of the piston according to the hydraulic pressures applied to the hydraulic inlet.

22. A power unit having a hydraulic inlet connection, a pressure-increasing plunger provided with two coacting pressure-responsive areas for high and low pressures respectively, a hydraulic outlet connection, and a modulating valve having a hydraulic plunger connected to the low pressure area for the control of the pressure-increasing plunger and the pressure of the fluid in the outlet connection.

23. A unitary power device, having a first casing member and a piston guided for movement therein, a second casing member larger in diameter than said first casing member and attached to the first casing member, a piston abutment in the second casing member having a spring cooperating therewith, a fluid connection to the unitary power device for operating the same, a fluid connection from the first casing member to a part to be moved to perform work, said unitary power device being completely enclosed except for the fluid connections operating the device, and a hydraulically-operated modulating valve, arranged to apply modulated pressure throughout the range of operation of the device, connected to said fluid connection.

24. A unitary power unit, having two casings attached together, one of said casings containing a plunger and a spring for moving the plunger to operate a part to perform work, and the other of said casings including a plunger connected to said first mentioned plunger and having a hydraulic connection to said part and a hydraulic means connected to the first mentioned casing for storing up power in said first mentioned spring to perform work.

25. A unitary power unit, having two casings attached together, one of said casings containing a plunger and a spring for moving the plunger to operate a part to perform work, and the other of said casings including a plunger connected to said first mentioned plunger and having a hydraulic connection to said part and a hydraulic means connected to the first mentioned casing for storing up power in said first mentioned spring to perform work, said first mentioned casing being closed except for the last mentioned connection.

26. A power unit, having a hydraulic inlet connection, a hydraulic outlet connection, a movable plunger mechanism for applying power to the outlet, said movable plunger mechanism comprising a power applying portion, a control portion in connection with the inlet having a cylinder, and a work-performing portion, said work-performing portion being adapted to receive power from the power applying portion and being in communication with the outlet, said inlet connection provided with a valve in operative connection with said plunger mechanism having a reaction therefrom, a power applying means coacting with said plunger mechanism, and the said valve including a modulating valve in communication with the inlet for control of the power, said power applying portion and work-performing portion being connected to move substantially together merely by the hydraulic pressure controlled by the modulating valve.

27. A unitary power unit, having a hydraulic inlet, adapted to apply a pressure, a modulating valve connected thereto, a hydraulic outlet, a plunger mechanism having a portion controlled by said hydraulic inlet, a portion having a spring adapted to accumulate pressure merely from said inlet pressure, and a work-performing portion adapted to be moved in one direction by the hydraulic pressure from the modulating valve while being subject to the reaction from the hydraulic outlet and adapted to be moved in the other direction by the spring accumulated pressure.

28. A power unit having a hydraulic inlet connection, an inlet chamber connected thereto, a hydraulic outlet connection, a plunger adapted to be moved in one direction by the liquid received from one of said connections, said plunger having a piston rod passing through said chamber, and a piston, a spring exerting a force on the piston to move the plunger in a direction opposite to the direction in which it is urged by the liquid from said inlet connection and a modulating valve connected to the inlet.

29. In combination, a manual means, a part, a unitary power means for moving said part to perform work and a fluid pressure means including a valve, having a hydraulic connection to the manual means and controlled by said manual means so as to control the application of said power to said part, adapted to receive a reaction on the manual means from said part by means of the valve, which has two pressure-responsive areas, one of which is connected hydraulically to the said part and the other connected hydraulically to the manual means, the unitary power means being mounted to operate without thrust from the manual means and without thrust from said part.

30. In combination, a power unit provided with a hydraulic inlet connection, a pressure-applying cylindrical plunger constituting means to apply pressure for work performance, having a rod operatively connected to the plunger, a power operated element having a movable wall operatively connected to said rod, adapted to deliver a higher range of hydraulic pressures, by means of said rod and plunger, than the hydraulic pressure received from said inlet connection, and a modulating valve associated with said inlet controlling the position of plunger travel coordinately with the variations of the pressure and volume of the liquid received from said inlet and delivered by said plunger and as determined by the modulating valve.

31. In combination, a power unit provided with a hydraulic inlet connection, a pressure-applying cylindrical plunger constituting means to apply pressure for work performance, having a rod operatively connected to the plunger, a power operated element having a movable wall operatively connected to said rod adapted to deliver a higher range of hydraulic pressures than the hydraulic pressure received from said inlet connection, having a rod and piston operatively connected to the plunger, a cylinder for said piston closed at both ends, and a modulating valve on said inlet controlling the position of plunger travel coordinately with the variations of the pressure and volume of the liquid received from said inlet and delivered by said plunger and as determined by the modulating valve.

32. In combination, a power unit comprising a power operated plunger means having a pressure-applying piston and cylinder, adapted to operate an accessory, an outlet connection from the pressure-applying piston on the cylinder leading to the accessory for operating the same, a power operated movable wall connected to the pressure-applying piston for moving the same, a hydraulic inlet connection on the unit between the movable wall and said piston for controlling the pressure applied from said wall, by means of said piston, a modulating valve controlling the power applied by means of said inlet, said plunger means being in communication with the inlet and movable by the increase of volume and pressure of liquid received from said inlet to coordinately control the position of said piston according to said increase of volume.

EDWARD A. ROCKWELL.

REFERENCES CITED

The following references are of record in the file of this patent:

UNITED STATES PATENTS

| Number | Name | Date |
|---|---|---|
| 1,571,517 | Fornaca | Feb. 2, 1926 |
| 1,478,832 | Neal | Dec. 25, 1923 |
| 1,794,237 | Mackey | Feb. 24, 1931 |
| 1,794,461 | Jackson | Mar. 3, 1931 |
| 2,029,070 | Higbee | Jan. 28, 1936 |
| 2,189,335 | Ace et al. | Feb. 6, 1940 |
| 2,042,392 | Dewandre | May 26, 1936 |
| 2,136,638 | Rockwell | Nov. 15, 1938 |
| 2,144,020 | Hunt | Jan. 17, 1939 |
| 1,903,973 | Boughton | Apr. 18, 1933 |
| 2,074,730 | Kerr | Mar. 23, 1937 |
| 2,106,758 | Oliver | Feb. 1, 1938 |
| 2,056,223 | Stout | Oct. 6, 1936 |
| 860,946 | Clair | July 23, 1907 |
| 1,552,584 | Sumner | Sept. 8, 1925 |
| 1,548,394 | Sumner | Aug. 4, 1925 |
| 2,037,758 | Bragg et al. | Apr. 21, 1936 |
| 1,962,857 | Cash | June 12, 1934 |

FOREIGN PATENTS

| Number | Country | Date |
|---|---|---|
| 811,009 | French | Apr. 5, 1937 |
| 777,293 | French | Feb. 15, 1935 |